(12) United States Patent
Jian et al.

(10) Patent No.: US 9,530,179 B2
(45) Date of Patent: Dec. 27, 2016

(54) TWO-DIMENSIONAL (2D)/THREE-DIMENSIONAL (3D) IMAGE PROCESSING METHOD AND SYSTEM

(71) Applicant: SuperD Co. Ltd., Shenzhen (CN)

(72) Inventors: Peiyun Jian, Shenzhen (CN); Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 208 days.

(21) Appl. No.: 14/223,022

(22) Filed: Mar. 24, 2014

(65) Prior Publication Data

US 2014/0285485 A1 Sep. 25, 2014

(30) Foreign Application Priority Data

Mar. 25, 2013 (CN) .......................... 2013 1 0097380

(51) Int. Cl.
  *G06T 3/00* (2006.01)
  *H04N 13/00* (2006.01)
  *H04N 13/04* (2006.01)

(52) U.S. Cl.
  CPC ........... *G06T 3/0056* (2013.01); *H04N 13/004* (2013.01); *H04N 13/0456* (2013.01)

(58) Field of Classification Search
  None
  See application file for complete search history.

(56) References Cited

U.S. PATENT DOCUMENTS

| 5,945,965 A  *  | 8/1999  | Inoguchi ............ G02B 27/2214 345/6 |
| 8,854,531 B2 * | 10/2014 | Karaoguz .......... H04N 13/0404 348/348 |
| 9,247,286 B2 * | 1/2016  | Karaoguz .......... H04N 13/0029 |

(Continued)

FOREIGN PATENT DOCUMENTS

| CN | 1074574 A | 7/1993 |
| CN | 1801218 A | 7/2006 |

(Continued)

OTHER PUBLICATIONS

Vipan Singla. "Bitwise Operators and Bit Masks" http://www.vipan.com/htdocs/bitwisehelp.html. Archived on Dec. 12, 2001. Retrieved on Dec. 13, 2015 from <https://web.archive.org/web/20011212135958/http://www.vipan.com/htdocs/bitwisehelp.html>.*

*Primary Examiner* — Zhengxi Liu
(74) *Attorney, Agent, or Firm* — Anova Law Group, PLLC (57) ABSTRACT

A method for processing two-dimensional (2D)/three-dimensional (3D) images on a same display area is provided. The method includes receiving image data containing both 2D and 3D images and creating a plurality of image containers including at least one top level image container and at least one sub-level image container, where each image container is provided with a display dimension identity and a coverage area identity. The method also includes determining display positions, dimensions, and occlusion relationships of the 2D and 3D images based on the plurality of image containers. Further, the method includes displaying images in the image containers with corresponding display dimension identities and coverage area identities with the display positions, dimensions, and occlusion relationships, (Continued)

where the display dimension identities include a 2D display and a 3D display.

17 Claims, 7 Drawing Sheets

(56) References Cited

U.S. PATENT DOCUMENTS

2009/0094208 A1* 4/2009 Marvit .............. G06F 17/30616
2011/0157169 A1* 6/2011 Bennett .................... G06F 3/14
345/419

FOREIGN PATENT DOCUMENTS

| CN | 101616334 A | 12/2009 |
| CN | 101945300 A | 1/2011 |
| CN | 102307306 A | 1/2012 |
| CN | 102722885 A | 10/2012 |
| WO | 2012103168 A1 | 8/2012 |

* cited by examiner

| 9 | 10 | 7 | | |
|---|---|---|---|---|
| 8 | 5 | 3 | 5 | 5 |
| 5 | 5 | 9 | 5 | 2 |
| 4 | 5 | 11 | 5 | 1 |
| 2 | 5 | 14 | 5 | |
| 0 | 5 | 16 | 5 | |

TWO-DIMENSIONAL (2D)/THREE-DIMENSIONAL (3D) IMAGE PROCESSING METHOD AND SYSTEM

CROSS-REFERENCES TO RELATED APPLICATIONS

This application claims priority of Chinese Patent Application No. 201310097380.0, filed on Mar. 25, 2013, the entire contents of which are incorporated by reference herein.

FIELD OF THE INVENTION

The present invention generally relates to the field of graphic image processing and, more particularly, to methods and systems for processing two-dimensional (2D)/three-dimensional (3D) images.

BACKGROUND

Existing autostereoscopic display devices employ parallax barriers or lenticular lenses to refract light in a horizontal direction to provide different perspective images for human eyes. Due to binocular disparity, naked human eyes can obtain images with complete depth information without the aid of any visual aid device (such as 3D glasses, helmets, etc.), achieving stereoscopic display effect.

Currently, in order to meet different browsing needs of users and improve user experiences, many autostereoscopic display devices can realize a 2D/3D hardware switch. The 2D/3D switch can be implemented by simply pressing a button on the hardware. When a 2D display mode does not meet the browsing needs, a 3D mode is switched to play stereo images, and the 2D display mode can also be switched back to view 2D flat images at any time.

However, this switch just unilaterally changes the beam split component of the display devices from hardware, and the image contents played are not necessarily changed in real-time. The ideal viewing effect can be achieved when the display devices play the flat image in the 2D mode and play the stereo images in the 3D mode. Therefore, under this approach that the 2D/3D modes are switched by pressing the button on the hardware, often the same image content is displayed in two different modes, and it cannot be clearly displayed in both modes.

In addition, there also exists an integrated 2D/3D technology. The hardware can be designed to support a local window in the 3D mode, so as to render the 3D effects in the local window of the display screen, while the remaining area displays the 2D effects. However, in addition to the same problem described above, i.e., the same display content cannot be clearly displayed in different display modes at the same time, because the local window of the 3D mode is usually a rectangular shape, it is difficult to implement 3D local windows with arbitrary shapes or to implement multiple 3D local windows, greatly limiting user experience.

The disclosed method and device are directed to solve one or more problems set forth above and other problems.

BRIEF SUMMARY OF THE DISCLOSURE

One aspect of the present disclosure includes a method for processing two-dimensional (2D)/three-dimensional (3D) images on a same display area. The method includes receiving image data containing both 2D and 3D images and creating a plurality of image containers including at least one top level image container and at least one sub-level image container, where each image container is provided with a display dimension identity and a coverage area identity. The method also includes determining display positions, dimensions, and occlusion relationships of the 2D and 3D images based on the plurality of image containers. Further, the method includes displaying images in the image containers with corresponding display dimension identities and coverage area identities with the display positions, dimensions, and occlusion relationships, where the display dimension identities include a 2D display and a 3D display.

Another aspect of the present disclosure includes a system for processing two-dimensional (2D)/three-dimensional (3D) images on a same display area. The system includes a reception module configured to receive image data containing both 2D and 3D images. The system also includes a creating module configured to create a plurality of image containers including at least one top level image container and at least one sub-level image container, where each image container is provided with a display dimension identity and a coverage area identity. Further, the system includes a display control module configured to display images in the image containers with corresponding display dimension identities and coverage area identities with the display positions, dimensions, and occlusion relationships, where the display dimension identities include a 2D display and a 3D display.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely some exemplary embodiments of the present invention. For those skilled in the art, on the premise of no inventive effort being involved, other drawings may also be obtained according to these drawings and the descriptions included herein.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

A 3D display terminal device may include any appropriate type of terminal device with a three dimensional (3D) display feature (e.g., 3D TVs, 3D phones, 3D computers, etc.). The 3D display terminal can contain a variety of 3D display technologies, such as polarized glasses technology, active shutter glasses technology, glasses-free prism display technology, glasses-free slit display technology, point-by-point switching 3D display technology, and real point-by-point switching 3D display technology. Different 3D display technologies have different technology characteristics, such as aperture ratio, grating tilt direction, refresh rate, etc. Therefore, the 3D display terminals corresponding to the different 3D display technologies have respectively different 3D image format requirements. For example, shutter glasses technology requires that left and right views quickly switch based on a certain frequency; polarized glasses technology requires interlacing (that is, display elements is arranged in alternating lines); and glasses-free slit display technology requires that display elements are arranged based on cycles and angles. Therefore, when implementing 3D display, based on these 3D display format requirements, left view and right view, or more views are rearranged in time and space.

The interactive terminals include certain input devices (e.g., a mouse, a keyboard, a touch screen, a camera, a gyroscope, etc.) or certain sensors (e.g., a distance sensor, a remote controller, etc.). The interactive terminals can send direct interactive instructions (such as a mouse click, a finger movement, etc.). The interactive terminals can also provide original interactive data. Then, the interactive instructions are obtained by analyzing the original interactive data using pattern recognition methods. For example, a position and a view direction of a user are obtained through a face tracking algorithm. The interactive terminal sends the interactive instructions to an image processing device. Based on the interactive instructions, the image processing device processes the image and sends a processing result to the 3D terminal to complete an interactive process.

Figure 13:
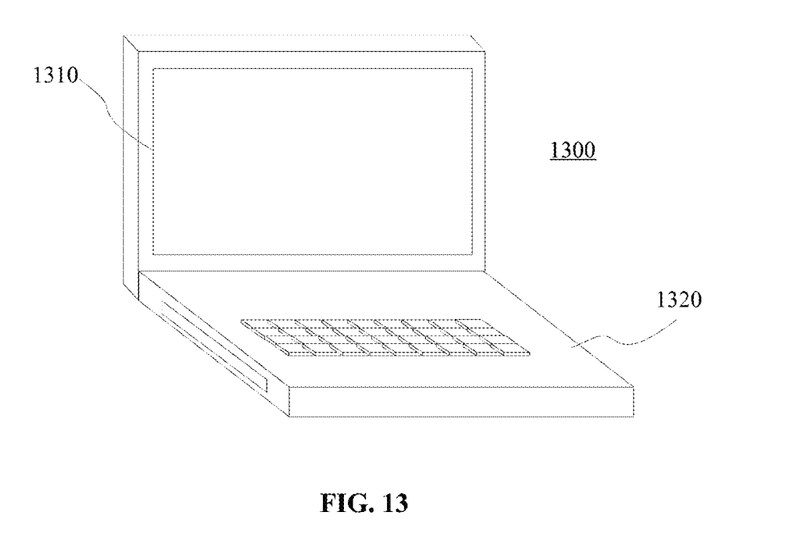
FIG. 13 illustrates an exemplary 3D display terminal device incorporating certain aspects of the invention.

FIG. 13 illustrates an exemplary 3D display terminal device incorporating certain aspects of the invention. As shown in FIG. 13, a three-dimensional (3D) display device 1300 may include a 3D display 1310 and a base 1320. The 3D display device 1300 may include any appropriate system that is capable of processing and displaying two-dimensional (2D) or 3D images, such as a computer, a television set, a smart phone, or a consumer electronic device. Although 3D display device 1300 is shown as a notebook computer, any device with computing power may be used.

The 3D display 1310 may include any appropriate type of 3D display screen based on plasma display panel (PDP) display, field emission display (FED), cathode ray tube (CRT) display, liquid crystal display (LCD), organic light emitting diode (OLED) display, or other types of displays. Further, 3D display 1310 may also be touch-sensitive, i.e., a touch screen. Other display types may also be used.

Figure 14:
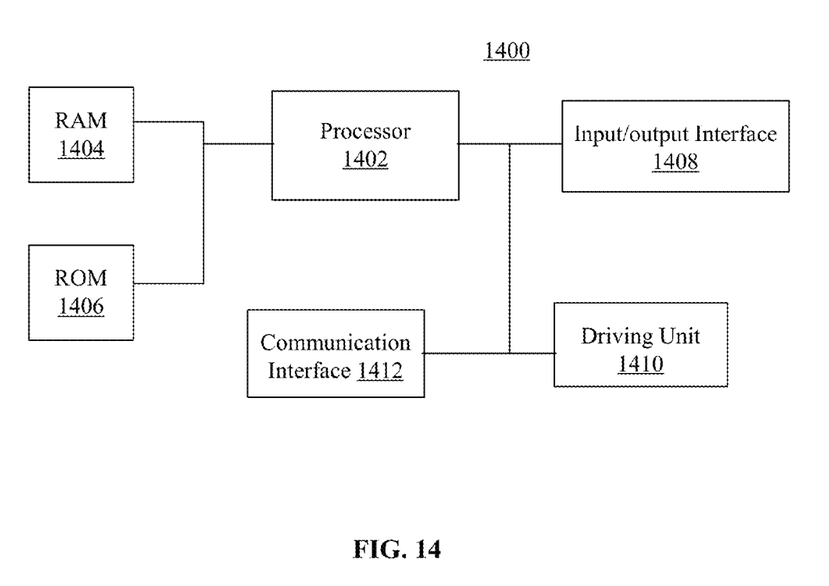
FIG. 14 illustrates a block diagram of a controller consistent with the disclosed embodiments.

Base 1320 may include any appropriate structures and components to support operations of 3D display device 1300. For example, base 1320 may include a controller to control operation of 3D display 1310. FIG. 14 illustrates an exemplary controller consistent with the disclosed embodiments.

As shown in FIG. 14, controller 1400 may include a processor 1402, a random access memory (RAM) unit 1404, a read-only memory (ROM) unit 1406, an input/output interface unit 1408, a driving unit 1410, and a communication interface 1412. Other components may be added and certain devices may be removed without departing from the principles of the disclosed embodiments.

Processor 1402 may include any appropriate type of graphic processing unit (GPU), general-purpose microprocessor, digital signal processor (DSP) or microcontroller, and application specific integrated circuit (ASIC), etc. Processor 1402 may execute sequences of computer program instructions to perform various processes associated with 3D display system 1300. The computer program instructions may be loaded into RAM 1404 for execution by processor 1402 from read-only memory 1406 to process various 3D images.

Input/output interface 1408 may be provided for users to input information into 3D display system 1300 or for the users to receive information from 3D display system 1300. For example, input/output interface 1408 may include any appropriate input device, such as a remote control, a keyboard, a mouse, an electronic tablet, a voice communication device, or any other optical or wireless input device. Further, driving unit 1410 may include any appropriate driving circuitry to drive various devices, such as 3D display device 1310.

Further, communication interface 1412 may provide communication connections such that controller 1400 may be accessed by and/or communicate with other processors or systems through computer networks or other communication links via various communication protocols, such as transmission control protocol/internet protocol (TCP/IP) and hypertext transfer protocol (HTTP).

Figure 1:
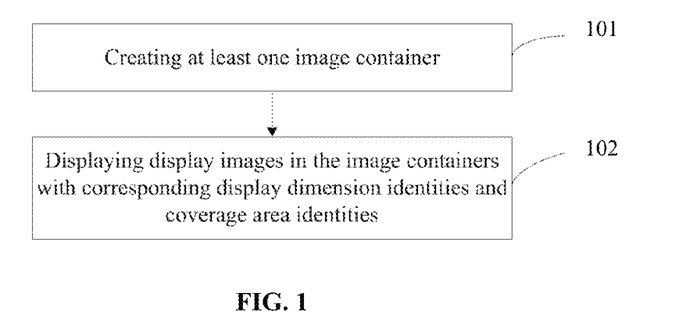
FIG. 1 illustrates a flowchart of an exemplary 2D/3D image processing process consistent with the disclosed embodiments.

During operation of the 3D display device, an image processing method can implement dynamic 3D display in one or multiple irregular windows in real-time, and keep all other areas render two-dimensional (2D) display. Image data containing both 2D and 3D images may be received from certain image input devices, such as a camera, a video player, etc. The image data may include pixel or a sub-pixel data of a plurality of 2D and 3D images. FIG. 1 illustrates a flowchart of an exemplary 2D/3D image processing process. As shown in FIG. 1, after receiving image data containing both 2D and 3D images, the process includes the following steps.

Step 101: Creating at Least One Image Container.

The image container is configured to form 2D/3D areas in a display area or a display screen. The image container may be any closed geometric shape. Every image container is provided with a display dimension identity and a coverage area identity. The display dimension identity includes a 3D display and a 2D display, identifying that the contents inside the image container is displayed in a 3D mode or a 2D mode. For example, the logical data "1" identifies the 3D display, and the logical data "0" identifies the 2D display. The coverage area identity identifies the position, shape and coverage area of the image container. The coverage area identity can be identified with a set of mask data. If the image container is a regular geometric shape, such as a triangle, a rectangle, or an oval, geometry parameters corresponding to the geometric shape can also be used as the coverage area identity.

Further, the image container can also have a container level and a depth level for subsequently determining occlusion relationships of various image containers, where the depth level can be represented by a depth value. The image container can also include a position identity that is used to determine the position of the image container in the entire display area. The position identity can be represented through coordinates of a minimum external rectangle of the image container.

For example, in multiple-video applications, at the beginning, a top-level image container is created. More than one sub-image containers can be created inside the top-level image container. The next level image containers can be created inside every sub-image container. The 2D and 3D image display areas are formed through fusing various levels of image containers.

Figure 2:
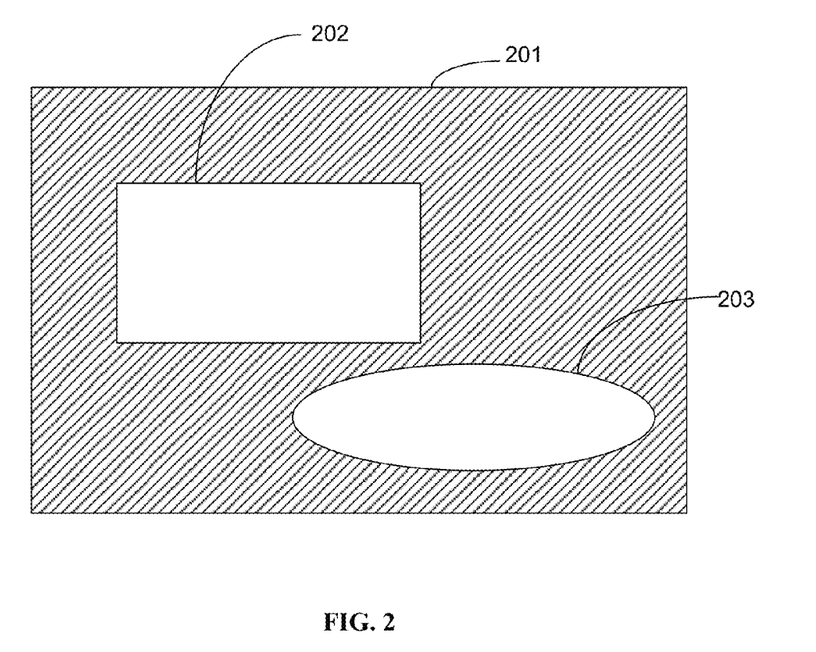
FIG. 2 illustrates a schematic diagram of an exemplary image container consistent with the disclosed embodiments.

FIG. 2 illustrates a schematic diagram of an exemplary image container consistent with the disclosed embodiments. As shown in FIG. 2, two videos need to be displayed in a rectangular 3D area and an oval 3D area, while other areas keep 2D display effect.

First, a rectangular top-level image container 201 is created, where its display dimension identity is 0 indicating that the image container 201 is displayed in a 2D display mode; its coverage area is an entire display image, and the area coverage identity may be represented by a set of mask data or the rectangle's geometry parameters (that is, coordinates of the four vertices of the rectangle). Then, a rectangular sub-image container 202 and an oval sub-image container 203 are created inside the top-level image container 201, respectively. The display dimension identities of the rectangular sub-image container 202 and the oval sub-image container 203 are 1, indicating that the rectangular sub-image container 202 and the oval sub-image container 203 are displayed in a 3D display mode.

The position, shape, and coverage area of the rectangular sub-image container 202 and the oval sub-image container 203 are the same as the rectangular and oval 3D areas displaying video applications, respectively. The position, shape, and coverage area can be represented by the mask data or the corresponding geometry parameters. Thus, the 2D and 3D areas shown in FIG. 2 can be formed in an entire display area through fusing all levels of the image containers, where an area with diagonal stripe lines is a 2D display area, and a blank area is a 3D display area.

Further, if the display image contains 3D dynamic display (that is, the display image contains 3D dynamic image elements that change over time), the display image also includes dynamic data that is used to indicate the 3D dynamic image elements contained in the display image.

When the 3D dynamic display is used, this Step also includes: creating a dynamic image container corresponding to the 3D dynamic image elements, and based on changes of coverage area and positions of 3D dynamic image elements in subsequent display images, updating the dynamic image container.

Figure 3:
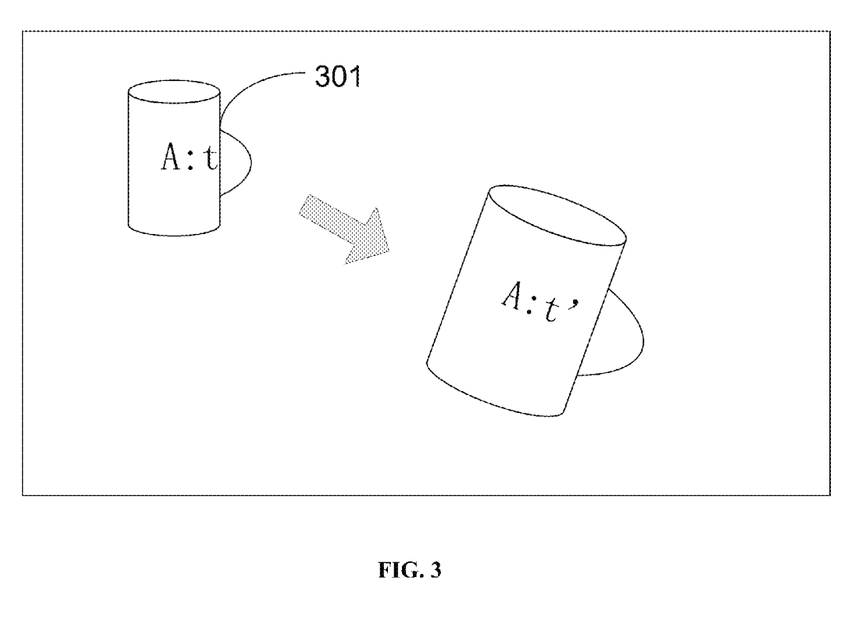
FIG. 3 illustrates a schematic diagram of another exemplary image container consistent with the disclosed embodiments.

For example, an object changing gradually over time is described in a video, a user interface (UI), a game, a demonstration, and other scenarios. FIG. 3 illustrates a schematic diagram of another exemplary image container consistent with the disclosed embodiments.

As shown in FIG. 3, at time t, a cup in the display image is recorded as A:t, and the shape, position and area of the cup are shown in FIG. 3. Then, the cup continuously rotates and becomes bigger. The cup also moves and is recorded as A:t' at time t'. During this process, the cup is always displayed in a 3D mode, and the remainder of the display image is displayed in a 2D mode. First, the cup is used as a 3D dynamic image element. A dynamic image container 301 corresponding to the cup is created, where its display dimension identity is 1 indicating that the image container 301 is displayed in the 3D mode. The shape, position and coverage area of the dynamic image container 301 are the same as the position, shape and area coverage of the cup A:t. Mask data "1" fills the image container 301, and mask data "0" fills the area outside the image container 301, where "0" represents that the display unit is displayed in the 2D mode, "1" represents that the display unit is displayed in the 3D mode. Then, based on the position, shape and coverage area of the cup of the subsequent images, the mask data of the image container 301 is updated, such that the position, shape and coverage area of the mask data of the image container 301 are the same as the position, shape and coverage area of the cup A:t'. Thus, by updating in real-time the position, shape and coverage area of the image container 301, a dynamic image display effect is achieved. The position, shape and mask data of the image container 301 corresponding to the 3D dynamic image element can be obtained from rendering environment in real-time or read through external data.

Further, if a user interacts with the display image through an interactive terminal, the display image also contains interactive instructions indicating that the user interacts with the display image. The interactive instructions may be sent out by the interactive terminal (such as a mouse, a touch screen, a camera, etc.). The interactive instructions may include zoom in, zoom out, rotate, shift, affine transformation, cropping, and so on. The process that the user sends out the interactive instructions through the interactive terminal may be implemented by physical buttons, virtual touch-keys, and so on.

Further, this step also includes: based on the interactive instructions, operating the image container corresponding to the display image.

Figure 4:
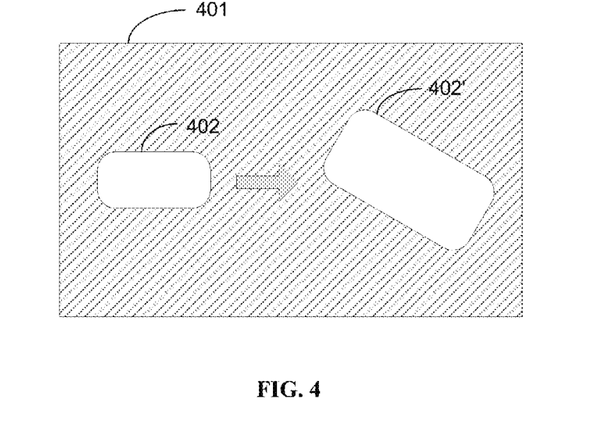
FIG. 4 illustrates a schematic diagram of another exemplary image container consistent with the disclosed embodiments.

Objects of the interactive instructions can be all levels of the image containers created. FIG. 4 illustrates a schematic diagram of another exemplary image container consistent with the disclosed embodiments. As shown in FIG. 4, a 2D area and a 3D area are displayed in entire display area, where the 2D area corresponds to a top-level image container 401, and the 3D area corresponds to a secondary level image container 402. A user clicks the 3D area through a mouse and sends out interactive instructions including rotating, zooming in and moving, such that the 3D area moves to the position of an image container 402'. Based on the interactive instructions, the subsequent mask data of image container 402 is updated to image container 402'.

Returning to FIG. 1, in Step 102: displaying images in the image containers with corresponding display dimension identities and coverage area identities.

First, based on container levels and depth levels of various image containers created in Step 101, the occlusion relationships of various image containers are determined, obtaining information of the entire display area.

The occlusion relationships include the followings.

A lower level image container occludes a higher level image container. Among the same level image containers, an image container with a higher depth level occludes an image container with a lower depth level.

Figure 5:
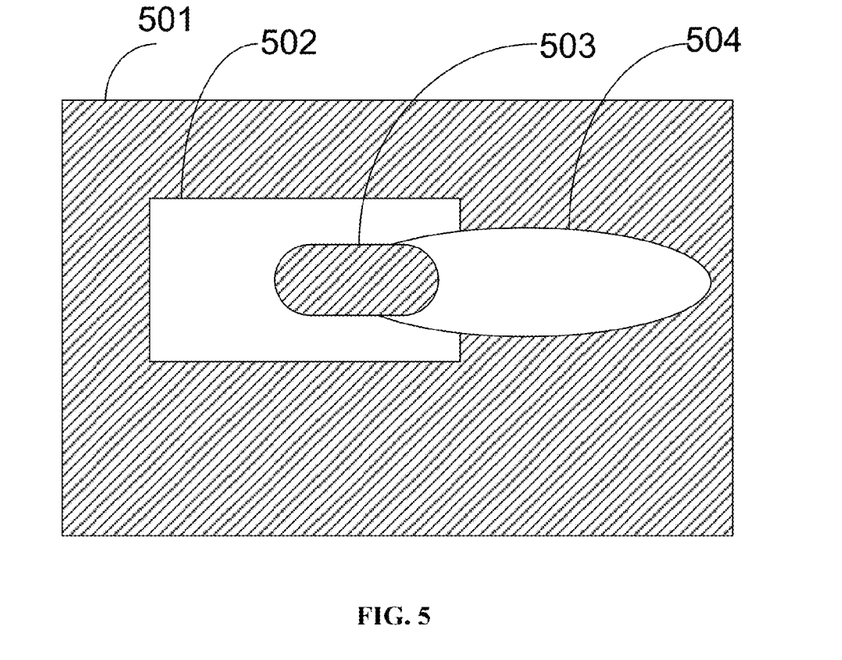
FIG. 5 illustrates a schematic diagram of an exemplary image display area consistent with the disclosed embodiments.

FIG. 5 illustrates a schematic diagram of an exemplary image display area consistent with the disclosed embodiments. As shown in FIG. 5, a top-level image container 501 is in a 2D display mode. A sub-image container 502 and a sub-image container 504 are the same level image containers and both image containers are in a 3D display mode, where the depth level of the sub-image container 502 is lower than the depth level of the sub-image container 504. The sub-image container 502 includes a next level sub-image container 503 with a 2D display mode. The sub-image container 502 and the sub-image container 504 occlude the top-level image container 501. The sub-image container 504 occludes the sub-image container 502. The next level sub-image container 503 occludes the sub-image container 502 and the sub-image container 504. A final display result is shown in FIG. 5, where the areas with diagonal stripe lines are 2D display areas, and blank areas are 3D display areas.

Secondly, information of the entire display area is sent to the terminal device. The terminal device refers to a 3D display terminal device. Based on different 3D display technologies, 3D formats requested by the different 3D terminal devices are also different. For a 3D terminal device with real point-by-point technology, the process for sending the display area information may include the followings.

Figure 6:
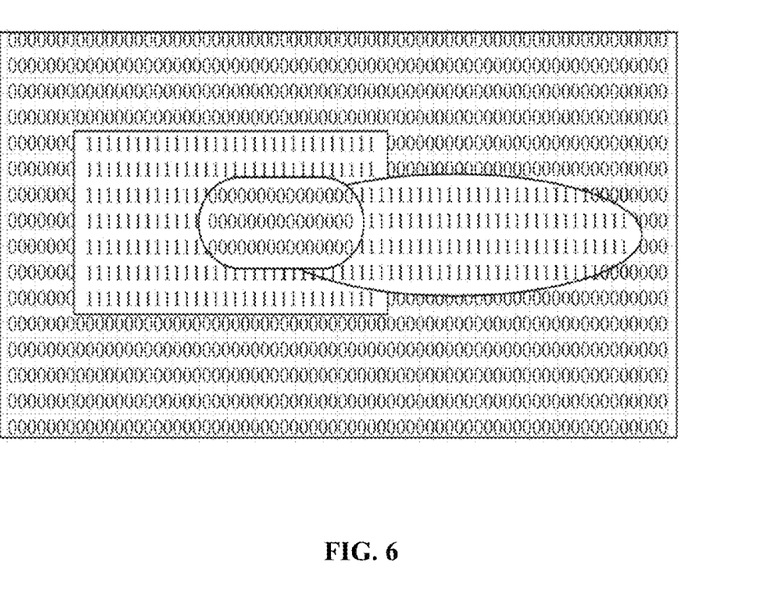
FIG. 6 illustrates an exemplary mask data map corresponding to an image display area shown in FIG. 5 consistent with the disclosed embodiments.

The information of the entire display area can be represented by mask data and sent out. The mask data is an intuitive, simple representation of data. Every bit of the mask data can be mapped to a display unit (e.g., a pixel or a sub-pixel), such that display status of every display unit in a display screen is exactly recorded. Of course, if the level of precision required is not high, every bit of the mask data can be mapped to multiple display units. For example, every bit of mask covers 2×2 display units, 4×4 display units, etc. FIG. 6 illustrates an exemplary mask data map corresponding to an image display area shown in FIG. 5 consistent with the disclosed embodiments. As shown in FIG. 6, "0" indicates that the display unit is in a 2D display mode, and "1" indicates that the display unit is in a 3D display mode.

If the information of the entire display area is represented by the mask data, the mask data can be sent to the 3D terminal device by a data bus, such as USB, I²C, HDMI, MIPI, and so on.

Further, the mask data can be transmitted after redundant mask data is reduced in time and space.

Specifically, when the dimension identity of the image container is 3D display and the coverage area identity of the image container changes, the information of the entire display area is sent to the terminal device through the mask data. Thus, only when the position, shape and coverage area of the 3D image container change, the mask data is sent, and sending the corresponding mask data at various display time is not needed. The sending frequency of the mask data can be reduced, thereby reducing the amount of data transmitted. Specifically, when the dimension identity of the image container is 3D display and the coverage area identity changes, the mask data before the coverage area identity changes and the mask data after the coverage area identity changes are performed a Logical XOR operation to obtain the data of a change area. The data of the change area and the position information of the change area are then sent to the terminal device.

Figure 7:
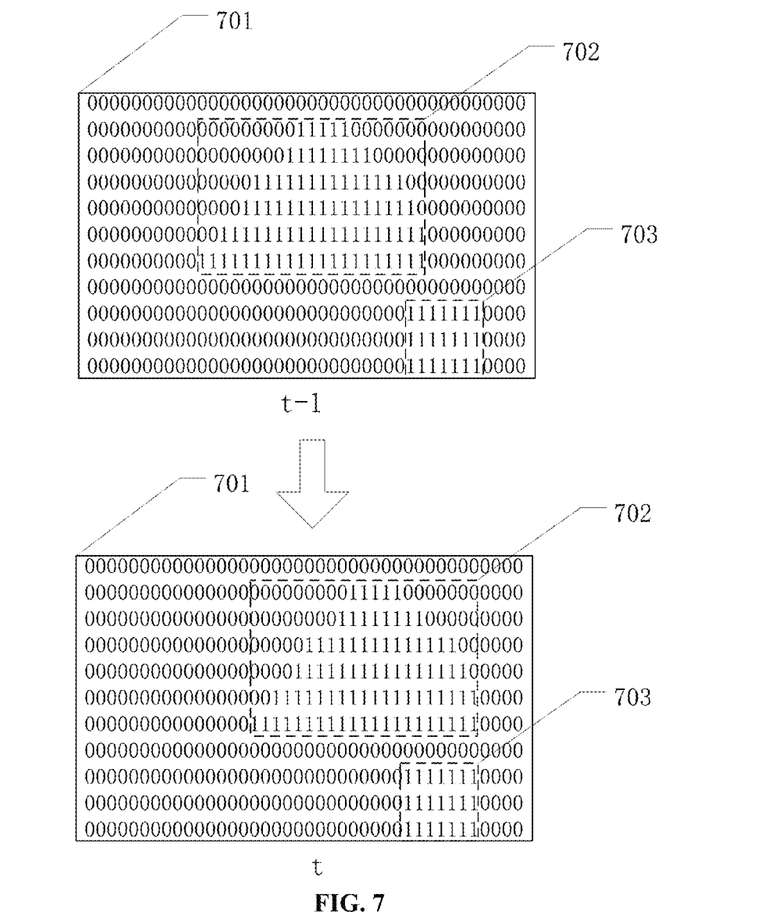
FIG. 7 illustrates exemplary mask data corresponding to the display area at time t−1 and time t consistent with the disclosed embodiments.

FIG. 7 illustrates an exemplary mask data corresponding to the display area at time t−1 and time t consistent with the disclosed embodiments. As shown in FIG. 7, entire display area includes an image container 701, an image container 702, and an image container 703. If only mask data of the image container 702 is changed from t−1 time to time t, the mask data of the image container 702 at t−1 time and the mask data of the image container 702 at time t are performed a XOR operation to obtain XOR data shown in FIG. 8. Thus, data of the change area between time t−1 and time t (that is, the mask data corresponding to the image container 702 shown in FIG. 8) can be captured and the data of the change area and the position information of the change area is sent to the 3D terminal device.

Further, in order to reduce the amount of the data transmitted, the mask data or the data of the change area can be compressed. The compressed mask data or the compressed data of the change area and the position information of the change area are sent to the 3D terminal device. Specifically, data distribution information of "0" and "1" can be coded.

Figure 8:
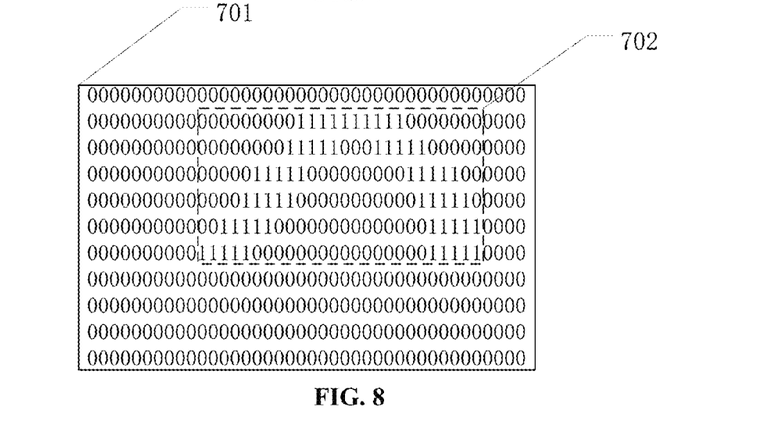
FIG. 8 illustrates an exemplary XOR data obtained by performing a XOR operation on mask data at time t−1 and mask data at time t consistent with the disclosed embodiments.
Figure 9:
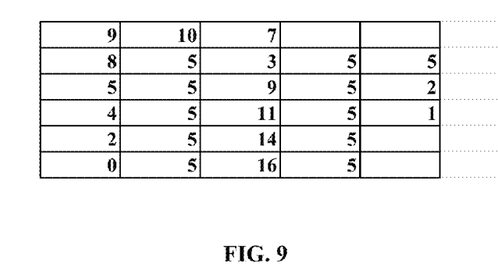
FIG. 9 illustrates exemplary transmission data obtained by compressing data in change area 702 shown in FIG. 8 consistent with the disclosed embodiments.

When the data of the change area 702 shown in FIG. 8 is compressed, the number of times that "0" and "1" of each line continuously appeared is used as transmission data. FIG. 9 illustrates exemplary transmission data obtained by compressing data in the change area 702 shown in FIG. 8 consistent with the disclosed embodiments. During data transmission, only the transmission data shown in the table in FIG. 9 is sent to the terminal device.

After the terminal device receives the data of the change area, if the terminal device detects that the data is compressed, the data needs to be uncompressed based on the compress method. That is, the data in FIG. 9 is restored to the data of the change area 702 in FIG. 8, to drive the display device for reconfiguring the display status of the 2D/3D switching units of the corresponding display positions.

In the above process, if the coverage area identity of the 3D image container is not changed from time t−1 to time t, data does not need to be transmitted, and the 3D terminal remains in the original state.

Figure 10:
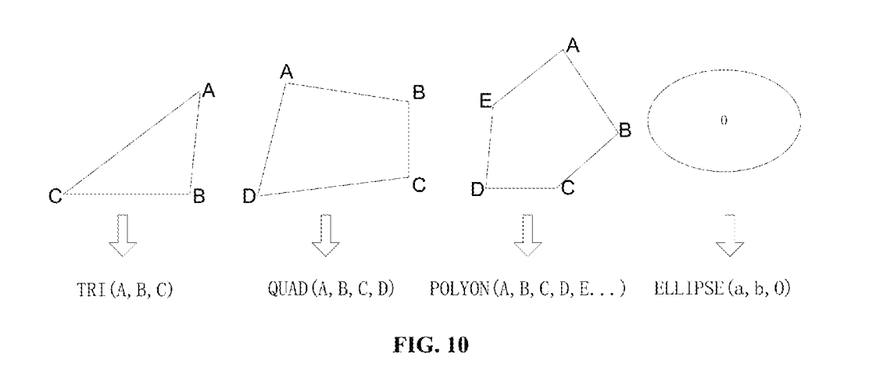
FIG. 10 illustrates a schematic diagram of an exemplary image container represented by geometry parameters consistent with the disclosed embodiments.

If the image container within the display area is a triangle, an oval and other regular shape, and the structure is substantially simple, information of the entire display area may also be represented by geometry parameters and sent out. FIG. 10 illustrates a schematic diagram of an exemplary image container represented by geometry parameters consistent with the disclosed embodiments.

As shown in FIG. 10, a triangle image container is represented by TRI and coordinates of the three vertices A, B, C of the image container are recorded, denoted as TRI (A, B, C). A quadrilateral image container is represented by QUAD, and =coordinates of the four vertices A, B, C, D of the image container are recorded, denoted as QUAD (A, B, C, D). A polygon image container is represented by POLYGON, and coordinates of all the vertices A, B, C, D, E, . . . of the image container are recorded, denoted as POLYGON (A, B, C, D, E, . . . ). A circle or an ellipse image container is represented by ELLIPSE, and coordinates of parameter a, parameter b, and a center of the image container is recorded based on a formula $$\frac{x^2}{a^2} + \frac{y^2}{b^2} = 1,$$

denoted by ELLIPSE (a, b, 0).

For a complex image container obtained through combining multiple regular image containers, the combination of the geometry parameters corresponding to various image containers are sent to the 3D terminal device through USB, I²C, HDMI, MIPI, and other data bus. The 3D terminal device restores the geometry shape of all the image containers through the geometry parameters. Based on the container levels and the depth levels of various image containers, the 3D terminal device determines the occlusion relationships of various image containers and obtains final display dimension identities of various image containers. Based on the geometry parameters of the image container and the final display dimension identity, the display status of a 2D/3D switching unit of the corresponding position in the display device is driven to reset.

Based on different application environment, the two types of representation and sending schemes of the display area information can be used separately or in combination. An image container with a complex shape may be represented by the mask data. An image container with a regular shape may be represented by the geometry parameters. Then, the entire display area information is obtained after the occlusion process is implemented based on the container levels and the depth levels.

Further, Step 102 may also include the followings.

Based on the occlusion relationships of various image containers, the final display dimension identities of the various image containers are determined.

When the final display dimension identity of an image container is a 3D display mode, view data corresponding to the 3D image container is obtained. Based on preset 3D formats in the terminal device, the view data is synthesized. The synthesized view data occludes the position corresponding to the 3D image container in the entire display area. Specifically, data of two or more views can be obtained through rendering images or reading external files.

For example, a 3D object is obtained by rendering at different angles for multiple times in a computer game. In a video playback, different view images can be read from video files of multiple views. After obtaining data of two or more view images, the obtained data needs to be synthesized based on preset 3D formats in a 3D display terminal. That is, information of two or more view images is presented by rearrangement of pixels or sub-pixels in a temporal or spatial sequence. Finally, the information of two or more views is synthesized into an image, making contents in the 3D image container to become the 3D format needed by the 3D terminal device. Subsequently, the synthesized view data occludes the position corresponding to the 3D image container in entire display area.

When the final display dimension identity of an image container is a 2D display mode, the corresponding 2D image container is copied to the corresponding position of the 2D image container in the entire display area to form an integrated 2D/3D fusion image.

Figure 11:
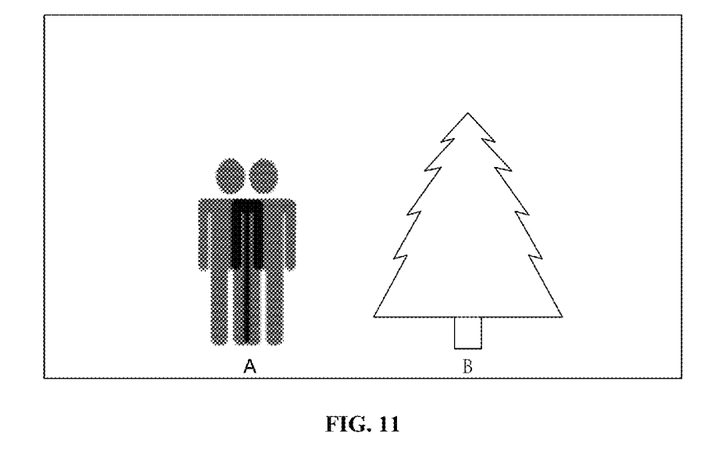
FIG. 11 illustrates an exemplary image effect after fusing 2D/3D image data consistent with the disclosed embodiments.

FIG. 11 illustrates an exemplary image effect after fusing 2D/3D image data consistent with the disclosed embodiments. As shown in FIG. 11, an object A is a 3D display mode, and the left and right view images of the object A are in interlaced arrangement. An object B is a 2D display mode and remains 2D display effect.

Finally, the 2D/3D fusion image is sent to the 3D terminal device. Based on the 2D/3D fusion image and a display status of 2D/3D switching units in corresponding positions of the display device, the 3D terminal device can display 2D/3D different areas on the same screen.

Thus, the disclosed method can realize dynamic 3D display in real-time in one or multiple irregular display areas, and other display areas remain a 2D display mode. Based on interactive instructions of 3D terminal device, the corresponding interactive operations can be implemented, improving user experience.

Figure 12:
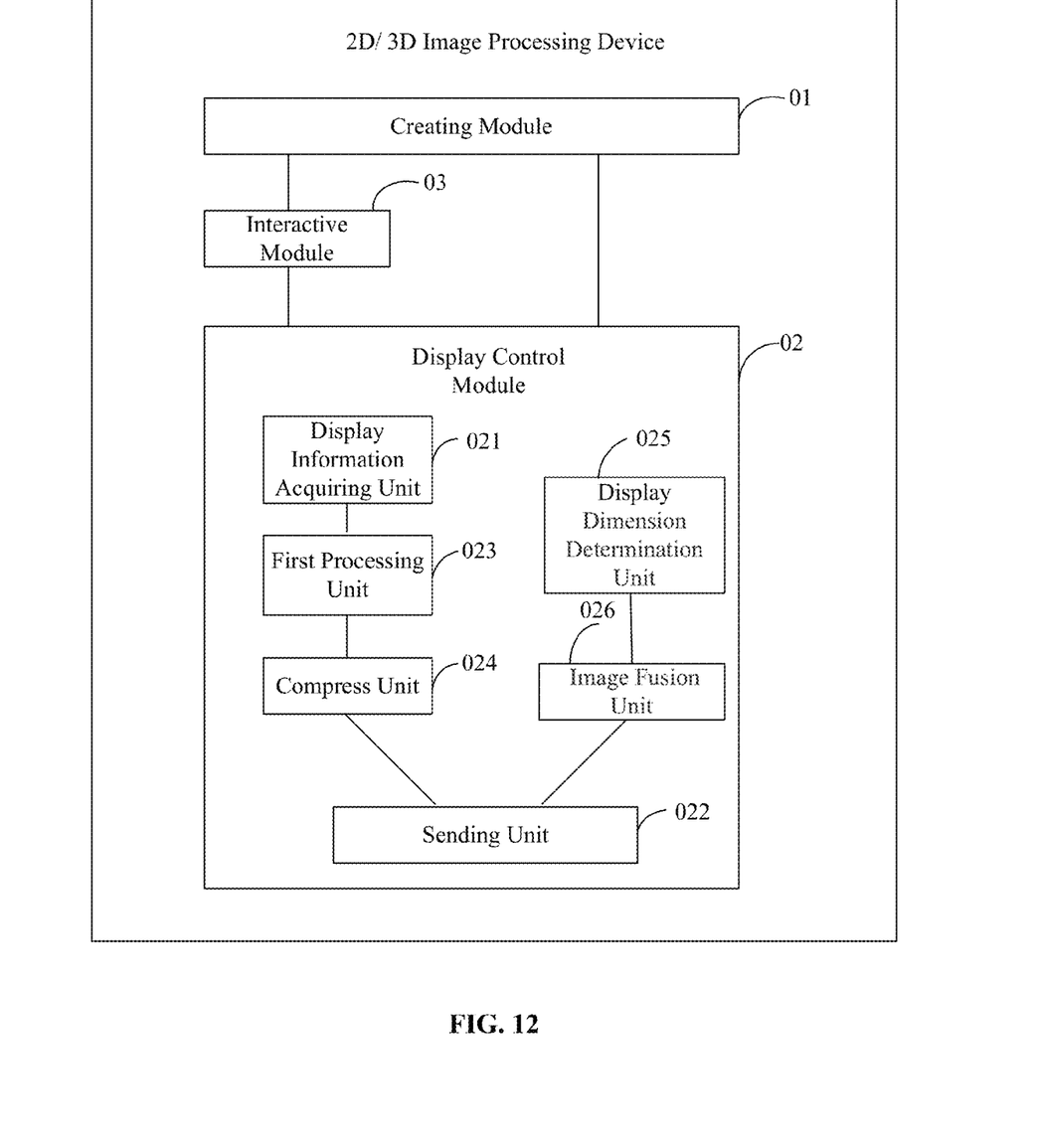
FIG. 12 illustrates a structure schematic diagram of an exemplary 2D/3D image processing device consistent with the disclosed embodiments.

FIG. 12 illustrates a structure schematic diagram of an exemplary 2D/3D image processing device (e.g., a processor or controller) consistent with the disclosed embodiments. As shown in FIG. 12, the 2D/3D image processing device includes a creating module 01, a display control module 02 and an interactive module 03, and a reception module (not shown in FIG. 12).

The reception module is configured to receive image data containing both 2D and 3D images.

The creating module 01 is configured to create at least one image container, where the image container is provided with a display dimension identity and a coverage area identity.

The display control module 02 is configured to display images in the image containers with corresponding display dimension identities and coverage area identities. Further, the display dimension identity includes 2D display and 3D display.

The display image also includes dynamic data that is used to indicate the 3D dynamic image elements contained in the display image. When the 3D dynamic display is used, the creating module 01 is also configured to create a dynamic image container corresponding to the 3D dynamic image elements, and based on changes of coverage area and positions of 3D dynamic image elements in subsequent display images, update the dynamic image container. Further, the display dimension identity includes 2D display and 3D display.

The display image also includes interactive instructions indicating that a user interacts with the display image. The interactive module 03 is configured to, based on the interactive instructions, operate the image container corresponding to the display image.

Further, the display control module 02 includes a display information acquiring unit 021, a sending unit 022, a first processing unit 023, a compress unit 024, a second processing unit 023' (not shown in FIG. 12), a display dimension determination unit 025, and an image fusion unit 026.

The display information acquiring unit 021 is configured to, based on the occlusion relationships of various image containers, acquire information of the entire display area. The sending unit 022 is configured to send the information of the entire display area to the terminal device. Optionally, the information of the entire display area is sent to the terminal device through mask data.

The first processing unit 023 is configured to, when the dimension identity of the image container is 3D display and the coverage area identity of the image container changes, send the information of the entire display area to the terminal device through the mask data. The compress unit 024 is configured to compress the mask data. The sending unit 022 is configured to send the compressed mask data to the terminal device. Optionally, the information of the entire display area is sent to the terminal device through geometry parameters.

The second processing unit 023' is configured to, when the dimension identity of the image container is 3D display, combine the geometry parameters corresponding to various image containers to obtain combined geometry parameters. The sending unit 022 is configured to send the combined geometry parameters to the terminal device.

The display dimension determination unit 025 is configured to, based on occlusion relationships of various image containers, determine final display dimension identities of the various image containers.

The image fusion unit 026 is configured to, when the final display dimension identity of an image container is a 3D display mode, obtain view data corresponding to the 3D image container, synthesize the view data based on preset 3D formats in the terminal device, and occlude the synthesized view data to the position corresponding to the 3D image container in the entire display area.

The image fusion unit 026 is also configured to, when the final display dimension identity of an image container is a 2D display mode, copy the corresponding 2D image container to the corresponding position of the 2D image container in the entire display area to form an integrated 2D/3D fusion image. The sending unit 022 is configured to send the 2D/3D fusion image to the terminal device.

By using the disclosed systems and methods, the 2D/3D display applications can be implemented, improving user experiences. Those of skill would further appreciate that the various illustrative modules and algorithm steps described in connection with the embodiments disclosed herein may be implemented as electronic hardware, computer software, or combinations of both. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing two-dimensional (2D)/three-dimensional (3D) images, comprising:
    receiving image data containing both 2D and 3D images;
    based on the 2D and 3D images, creating a plurality of image containers including at least one top level image container and at least one sub-level image container and at least one third-level image container in a display area, wherein each image container is provided with a container level representing a degree of hierarchy of the plurality of image containers, a depth level represented by a depth value, a display dimension identity and a coverage area identity;
    determining display positions, dimensions, and occlusion relationships of the plurality of image containers, wherein a lower container level image container occludes a higher container level image container, an image container with a higher depth level occludes an image container with a lower depth level among the same container level image containers; and
    displaying images in the image containers with corresponding display dimension identities and coverage area identities with the display positions, dimensions, and occlusion relationships, wherein the display dimension identities include a 2D display and a 3D display.

2. The method according to claim 1, wherein:
    when a display image contains a 3D dynamic display, the display image also contains dynamic data that is used to indicate 3D dynamic image elements contained in the display image; and
    when the 3D dynamic display is used, a dynamic image container corresponding to the 3D dynamic image elements is created, and based on changes of coverage area and positions of the 3D dynamic image elements in subsequent display images, the dynamic image container is updated.

3. The method according to claim 1, wherein:
    a display image contains interactive instructions indicating that a user interacts with the display image; and
    based on the interactive instructions, the image container corresponding to the display image is operated.

4. The method according to claim 3, wherein displaying images in the image containers with corresponding display dimension identities further includes:
    based on the occlusion relationships of the plurality of image containers, acquiring information of an entire display area; and
    sending the information of the entire display area to a terminal device.

5. The method according to claim 4, further including:
    sending the information of the entire display area to the terminal device through any one of mask data and geometry parameters.

6. The method according to claim 5, further including:
    when the dimension identity of the image container is the 3D display and the coverage area identity of the image container changes, sending the information of the entire display area to the terminal device through the mask data.

7. The method according to claim 6, further including:
    when the dimension identity of the image container is the 3D display and the coverage area identity of the image container changes, performing a logical XOR operation on the mask data before the coverage area identity changes and the mask data after the coverage area identity changes to obtain data of a change area; and
    sending the data of the change area and position information of the change area to the terminal device.

8. The method according to claim 7, wherein sending the information of the entire display area to the terminal device through the mask data includes:
    compressing any one of the mask data and the data of the change area; and
    sending any one of the compressed mask data and the compressed data of the change area as well as the position information of the change area to the terminal device.

9. The method according to claim 5, wherein sending the information of the entire display area to the terminal device through the geometry parameters includes:
    when the dimension identity of the image container is the 3D display, sending combination of the geometry parameters corresponding to the plurality of image containers to the terminal device.

10. The method according to claim 3, wherein displaying display images in the image containers with the corresponding display dimension identities includes:
based on the occlusion relationships of the plurality of image containers, determining final display dimension identities of the plurality of image containers;
when the final display dimension identity of an image container is the 3D display, obtaining view data corresponding to the 3D image container, synthesizing the view data based on preset 3D formats in the terminal device, and occluding the synthesized view data to the position corresponding to the 3D image container in the entire display area;
when the final display dimension identity of an image container is the 2D display, copying the corresponding 2D image container to the position corresponding to the 2D image container in the entire display area to form an integrated 2D/3D fusion image; and
sending the integrated 2D/3D fusion image to the terminal device.

11. A system for processing two-dimensional (2D)/three-dimensional (3D) images, comprising one or more processors, memory, and one or more program units stored in the memory and to be executed by the one or more processors, the one or more program units comprising:
a reception module configured to receive image data containing both 2D and 3D images;
a creating module configured to create a plurality of image containers including at least one top level image container and at least one sub-level image container and at least one third-level image container in a display area, wherein each image container is provided with a container level representing a degree of hierarchy of the plurality of image containers, a depth level represented by a depth value, a display dimension identity and a coverage area identity; and
a display control module configured to display images in the image containers with corresponding display dimension identities and coverage area identities with the display positions, dimensions, and occlusion relationships,
wherein the display dimension identities include a 2D display and a 3D display, a lower container level image container occludes a higher container level image container, and an image container with a higher depth level occludes an image container with a lower depth level among the same container level image containers.

12. The system according to claim 11, wherein:
a display image includes dynamic data that is used to indicate 3D dynamic image elements contained in the display image; and
the creating module is also configured to create a dynamic image container corresponding to the 3D dynamic image elements, and based on changes of coverage area and positions of 3D dynamic image elements in subsequent display images, update the dynamic image container.

13. The system according to claim 12, wherein:
the display image also contains interactive instructions indicating that a user interacts with the display image; and
an interactive module is configured to, based on the interactive instructions, operate the image container corresponding to the display image.

14. The system according to claim 13, wherein the display control module further includes:
a display information acquiring unit configured to, based on the occlusion relationships of the plurality of image containers, acquire information of an entire display area; and
a sending unit configured to send the information of the entire display area to a terminal device.

15. The system according to claim 14, when the information of the entire display area is sent to the terminal device through mask data, further including:
a first processing unit configured to, when the dimension identity of the image container is the 3D display and the coverage area identity of the image container changes, send the information of the entire display area to the terminal device through the mask data;
a compress unit configured to compress the mask data; and
the sending unit configured to send the compressed mask data to the terminal device.

16. The system according to claim 14, when the information of the entire display area is sent to the terminal device through geometry parameters, further including:
a second processing unit configured to, when the dimension identity of the image container is the 3D display, combine the geometry parameters corresponding to the plurality of image containers to obtain combined geometry parameters; and
the sending unit configured to send the combined geometry parameters to the terminal device.

17. The system according to claim 13, wherein the display control module further includes:
a display dimension determination unit configured to, based on occlusion relationships of the plurality of image containers, determine final display dimension identities of the plurality of image containers;
an image fusion unit configured to:
when the final display dimension identity of an image container is the 3D display, obtain view data corresponding to the 3D image container, synthesize the view data based on preset 3D formats in the terminal device, and occlude the synthesized view data to the position corresponding to the 3D image container in the entire display area; and
when the final display dimension identity of an image container is the 2D display, copy the corresponding 2D image container to the position corresponding to the 2D image container in the entire display area to form an integrated 2D/3D fusion image; and
the sending unit configured to send the integrated 2D/3D fusion image to the terminal device.

* * * * *